United States Patent
Iyer et al.

(10) Patent No.: US 9,489,172 B2
(45) Date of Patent: Nov. 8, 2016

(54) METHOD AND APPARATUS FOR VOICE CONTROL USER INTERFACE WITH DISCREET OPERATING MODE

(71) Applicant: Motorola Mobility LLC, Chicago, IL (US)

(72) Inventors: Boby Iyer, Elmhurst, IL (US); Kevin O Foy, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/631,924

(22) Filed: Feb. 26, 2015

(65) Prior Publication Data

US 2016/0253149 A1    Sep. 1, 2016

(51) Int. Cl.

| G01L 21/00 | (2006.01) |
|---|---|
| G10L 15/00 | (2013.01) |
| G06F 3/16 | (2006.01) |
| G10L 17/22 | (2013.01) |
| G06F 3/01 | (2006.01) |

(52) U.S. Cl.
CPC ............ *G06F 3/167* (2013.01); *G06F 3/017* (2013.01); *G10L 17/22* (2013.01)

(58) Field of Classification Search
None
See application file for complete search history.

(56) References Cited

U.S. PATENT DOCUMENTS

| 6,925,296 | B2 * | 8/2005 | Mattisson | ........... H04M 1/6016 367/118 |
|---|---|---|---|---|
| 7,263,373 | B2 * | 8/2007 | Mattisson | ............. H04M 1/605 367/118 |
| 9,183,806 | B2 * | 11/2015 | Felt | .......................... G09G 5/00 |
| 9,311,898 | B2 * | 4/2016 | Ward | ................... G06F 3/0488 |
| 2006/0085183 | A1 | 4/2006 | Jain | |
| 2006/0270450 | A1 | 11/2006 | Garratt et al. | |
| 2008/0243281 | A1 | 10/2008 | Kadaba et al. | |
| 2011/0313768 | A1 * | 12/2011 | Klein | ...................... G06F 3/017 704/251 |
| 2013/0076990 | A1 | 3/2013 | Kim et al. | |
| 2013/0260839 | A1 * | 10/2013 | Moquin | ................ H04M 1/605 455/569.1 |
| 2013/0293503 | A1 * | 11/2013 | Zhou | ................... G06F 3/04883 345/173 |
| 2014/0223477 | A1 | 8/2014 | Han et al. | |
| 2014/0278443 | A1 | 9/2014 | Gunn et al. | |
| 2015/0135078 | A1 * | 5/2015 | Erkkila | ............... G06F 19/3406 715/727 |
| 2015/0148106 | A1 * | 5/2015 | Choi | ................... H04W 52/027 455/566 |
| 2016/0077794 | A1 * | 3/2016 | Kim | ....................... G06F 3/167 704/275 |
| 2016/0086600 | A1 * | 3/2016 | Bauer | .................... G10L 15/16 704/202 |
| 2016/0202871 | A1 * | 7/2016 | Ward | ................... G06F 3/0488 345/175 |

FOREIGN PATENT DOCUMENTS

WO    WO2014/163284    5/2011

OTHER PUBLICATIONS

Application No. GB1603200.5; Great Britain Search Report; Mailed Aug. 15, 2016.

* cited by examiner

*Primary Examiner* — Satwant Singh

(57) ABSTRACT

An electronic device includes a voice control interface engine operative in a first mode to receive a speech command, through a microphone, from a first distance and produce, through a loudspeaker and in response to the speech command, an audible output at a first output level. One or more processors are operable with one or more sensors to detect a predefined user input. The one or more processors can then transition the voice control interface engine to a second mode operative to receive the speech command from a second distance and produce, in response to the speech command, the audible output at a second output level, where the second distance is less than the first distance and the second output level less than the first output level.

20 Claims, 6 Drawing Sheets

METHOD AND APPARATUS FOR VOICE CONTROL USER INTERFACE WITH DISCREET OPERATING MODE

BACKGROUND

1. Technical Field

This disclosure relates generally to electronic devices and corresponding methods, and more particularly to electronic devices with voice recognition systems.

2. Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

Unforeseen problems sometimes accompany technological advance. Illustrating by example, when near-field wireless devices such as hands-free headsets first appeared, people began conducting telephone calls through a small, wireless earbud device while their mobile phone was in a bag or pocket. To the innocent observer, it looked as if these technologically advanced people were instead crazy since they talked aloud to—what appeared to be—themselves. Some early adopters continued to hold their mobile phones in their hands, albeit unnecessary, just to show passersby that they were indeed conducting a telephone call as opposed to ranting to the air.

It would be advantageous to have additional solutions, in the form of an improved apparatus, an improved method, or both, to these unforeseen problems resulting from technological advances occurring in electronic devices.

Figure 1:
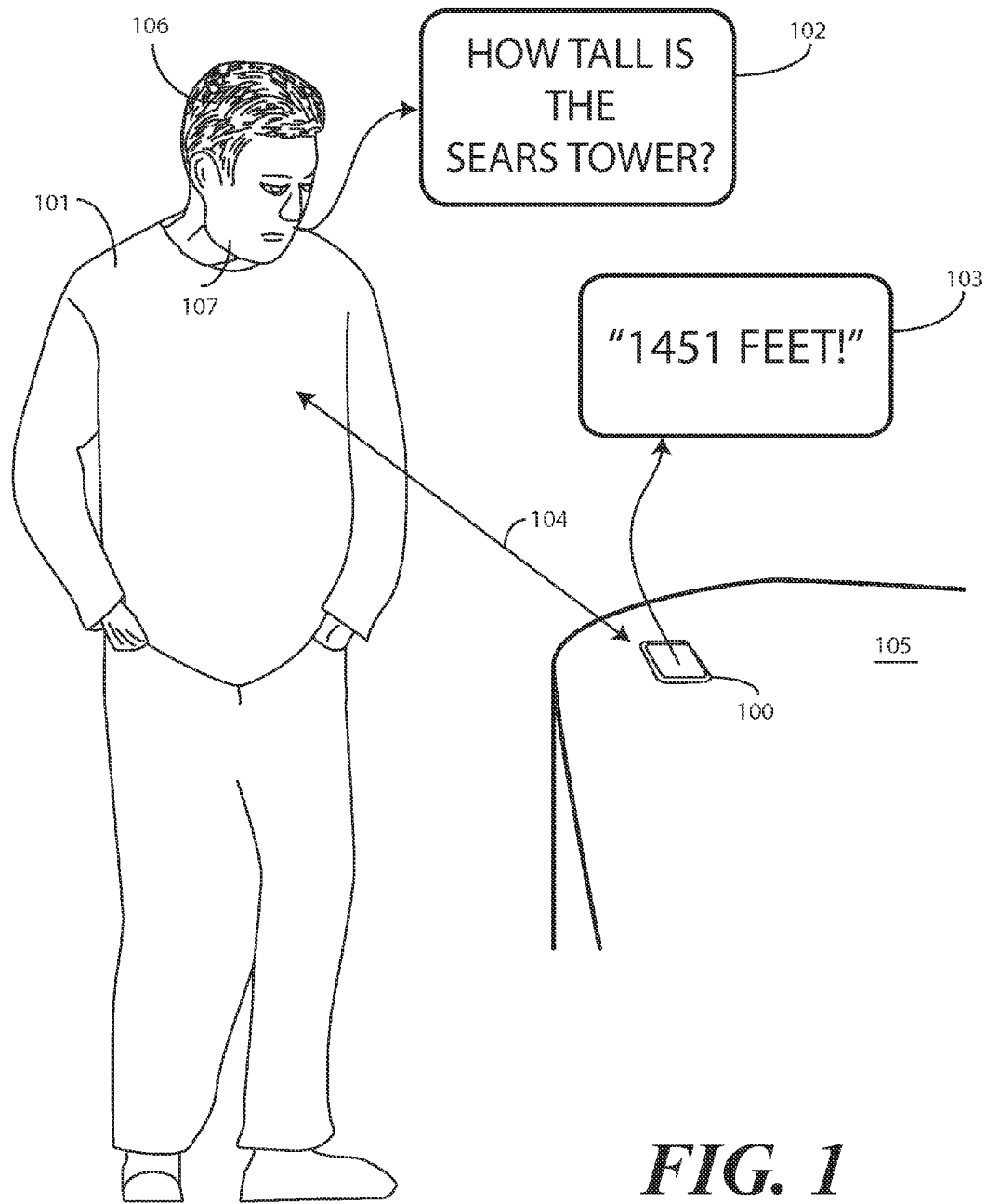
FIG. 1 illustrates a user interacting with a prior art electronic device having voice recognition capabilities.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to transitioning a voice control interface engine of an electronic device from a first mode, where voice commands can be received from a first distance and audible output returned at a first output level, to a second mode where voice commands are received from only a second, shorter distance and audible output is delivered at a second, lesser output level. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of transitioning a voice control interface engine of an electronic device between a first mode and a second mode as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the transition of a voice control interface engine between a first mode and a second mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and apparatuses for transitioning a voice control interface engine operating in an electronic device between a normal mode of operation and a discreet mode of operation. In one embodiment, a voice control interface engine is operable to receive voice commands and deliver audible responses to a user. For example, the voice control interface engine can receive a speech command in which a user asks a question. The electronic device may then search the Internet for the answer and, in response to receiving the speech command, deliver an audible output to the user with the answer.

Embodiments of the disclosure contemplate that one unforeseen consequence of voice recognition systems is that a user may not want passersby to hear the audible output. This is especially true when the audible output includes an enunciation of personal information. With this unforeseen problem in mind, embodiments of the disclosure advantageously provide a method and system to cause the voice control interface engine to inter a second, "discreet" mode of operation.

In one embodiment, a voice control interface engine operating in an electronic device is operative in a first mode. The first mode, in one embodiment, is a normal mode of operation or a default mode of operation. When operating in this mode, the voice control interface engine is operable to receive a speech command, through a microphone, from a first distance. The voice control interface engine is then to produce, through a loudspeaker and in response to the speech command, an audible output at a first output level. Illustrating by example, the voice control interface engine may be operable to receive voice commands from a user standing two, three, or more feet away and then deliver the audible output to a loudspeaker at a level sufficient for the user to hear it from the same distance.

One or more processors, which can be operable with one or more sensors, also function within the electronic device. In one embodiment, the one or more processors are operable with the one or more sensors to detect a predefined user input. Examples of the predefined user input include a predefined motion of the electronic device, a predefined gesture input, detection of a user's head becoming proximately located with the electronic device, or actuation of a user actuation target of the electronic device. In one embodiment, when this occurs the one or more processors are operable to transition the voice control interface engine to a second mode operative to receive the speech command from a second distance and produce, in response to the speech command, the audible output at a second output level. In one embodiment the second distance is less than the first distance and the second output level is less than the first output level. This second mode of operation, i.e., the discreet mode, allows the user to deliver voice commands with a much lower volume and receive responses at a level that others will not overhear. For instance, when in the discreet mode of operation, the user may whisper voice commands to the microphone, while hearing audible responses from an earpiece speaker rather than a loudspeaker.

Turning now to FIG. 1, illustrated therein is a prior art electronic device 100 configured with a voice controlled user interface. One example of such a prior art electronic device 100 is described US Published Patent Application No. 2014/0278443 to Gunn et al., which is incorporated herein by reference. Essentially, the prior art electronic device 100 includes a voice controlled user interface to receive a speech command phrase, identify a speech command phrase segment, and perform a control operation in response to the segment. In one embodiment, the control operation is the delivery of an audible response.

FIG. 1 illustrates a use case that highlights an unforeseen problem associated with the otherwise incredibly convenient functionality offered by the voice controlled user interface. A user 101 delivers, in a normal conversational tone, a voice command 102 that asks, "How tall is the Sears Tower?" The prior art electronic device 100, using its voice controlled user interface and one or more other applications, retrieves the answer from a remote source and announces the answer with an audible output 103. In this case, the prior art electronic device announces, at a volume level sufficient for the user 101 to hear it from several feet away, "Fourteen hundred and fifty one feet."

Two things are of note in FIG. 1. First, due to the convenience offered by the voice controlled user interface, the user 101 has been able to determine a trivia fact simply by speaking. The user 101 did not have to access a book, computer, or other person. The prior art electronic device 100 simply found the answer and delivered it.

Second, the audible output 103 was delivered at an output level that was sufficient for the user 101 to hear it from a distance away. Embodiments of the disclosure contemplate that if the user 101 was able to hear it from a few feet away, so too would a passerby or eavesdropper. Embodiments of the disclosure contemplate that the user 101 may not care if a third party listens in on the answer to the question, "How tall is the Sears Tower?" However, if the user's voice command had been "play me my voice mail," the user 101 may not want a third party to hear their doctor giving a medical diagnosis. Similarly, the user 101 may not want a third party to hear their significant other breaking up with them or using expletives after they forgot an anniversary. Advantageously, embodiments of the disclosure provide an apparatus and method for transitioning a voice control interface engine into a second, discreet mode of operation where the medical diagnosis, breakup, or expletives are heard only by the person for whom they were intended.

Figure 2:
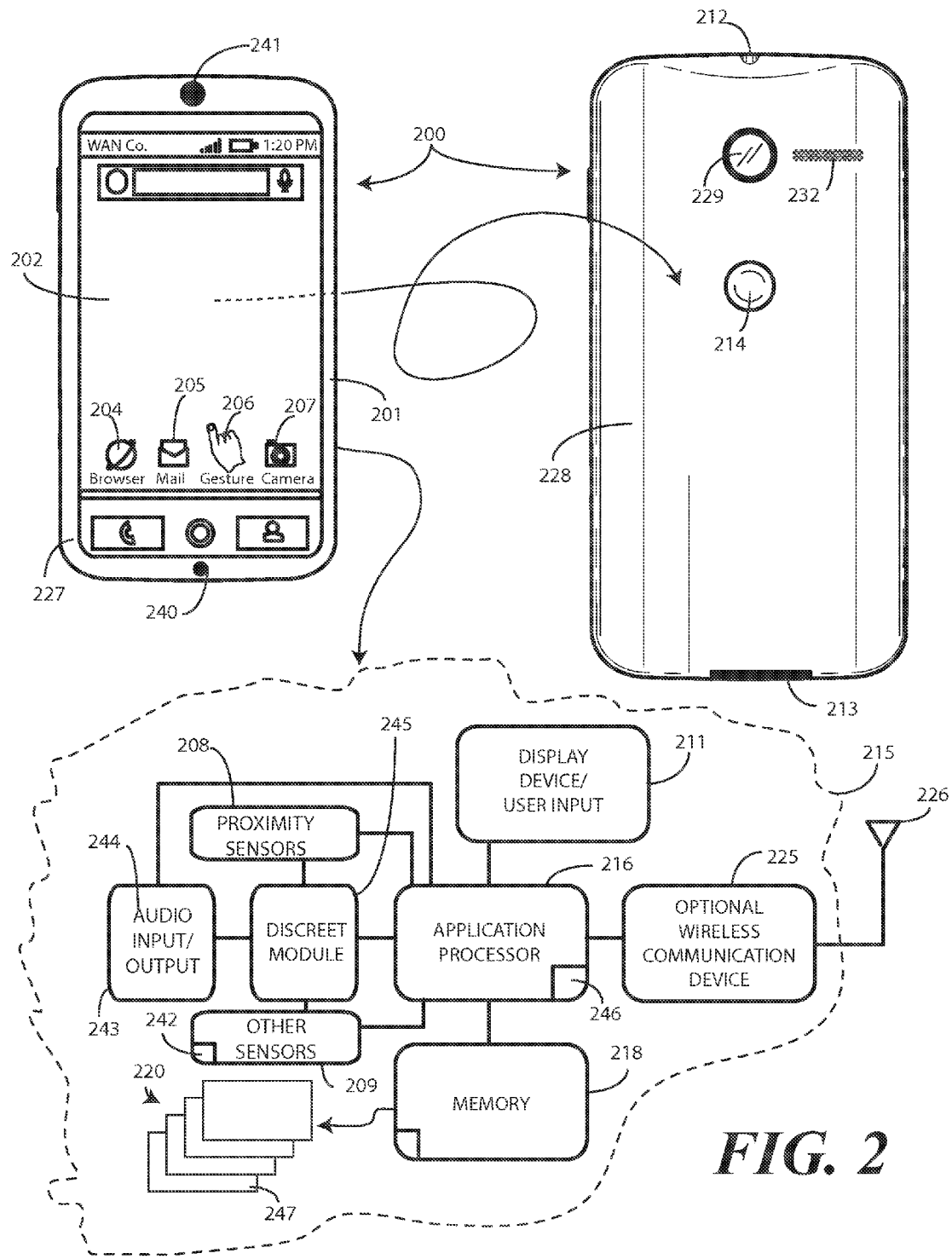
FIG. 2 illustrates a schematic block diagram of one explanatory electronic device in accordance with one or more embodiments of the disclosure.

Turning now to FIG. 2, illustrated therein is one explanatory electronic device 200 configured in accordance with one or more embodiments of the disclosure. The electronic device 200 of FIG. 2 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 200 could equally be a palm-top computer, a tablet computer, a gaming device, a media player, or other device.

This illustrative electronic device 200 includes a display 202, which may optionally be touch-sensitive. In one embodiment where the display 202 is touch-sensitive, the display 202 can serve as a primary user interface 211 of the electronic device 200. Users can deliver user input to the display 202 of such an embodiment by delivering touch input from a finger, stylus, or other objects disposed proximately with the display. In one embodiment, the display 202 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 includes a housing 201. In one embodiment, the housing 201 includes two housing members. A front housing member 227 is disposed about the periphery of the display 202 in one embodiment. A rear-housing member 228 forms the backside of the electronic device 200 in this illustrative embodiment and defines a rear major face of the electronic device. Features can be incorporated into the housing members 227,228. Examples of such features include an optional camera 229 or an optional speaker port 232 disposed atop a loudspeaker. These features are shown being disposed on the rear major face of the electronic device 200 in this embodiment, but could be located elsewhere. In this illustrative embodiment, a user interface component, which may be a button 214 or touch sensitive surface, can also be disposed along the rear-housing member 228.

In one embodiment, the electronic device 200 includes one or more connectors 212,213, which can include an analog connector, a digital connector, or combinations thereof. In this illustrative embodiment, connector 212 is an analog connector disposed on a first edge, i.e., the top edge, of the electronic device 200, while connector 213 is a digital connector disposed on a second edge opposite the first edge, which is the bottom edge in this embodiment.

A block diagram schematic 215 of the electronic device 200 is also shown in FIG. 2. In one embodiment, the electronic device 200 includes one or more processors 216. In one embodiment, the one or more processors 216 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 200. Each of the application processor and the auxiliary processor(s) can be configured to process and execute executable software code to perform the various functions of the electronic device 200. A storage device, such as memory 218, can optionally store the executable software code used by the one or more processors 216 during operation.

In this illustrative embodiment, the electronic device 200 also includes a communication circuit 225 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 225 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 225 can include wireless communication circuitry, one of a receiver, a transmitter, or transceiver, and one or more antennas 226.

In one embodiment, the one or more processors 216 can be responsible for performing the primary functions of the electronic device 200. For example, in one embodiment the one or more processors 216 comprise one or more circuits operable with one or more user interface devices, which can include the display 202, to present presentation information to a user. The executable software code used by the one or more processors 216 can be configured as one or more modules 220 that are operable with the one or more processors 216. Such modules 220 can store instructions, control algorithms, logic steps, and so forth.

In one embodiment, one or more proximity sensors 208 can be operable with the one or more processors 216. In one embodiment, the one or more proximity sensors 208 include one or more signal receivers and signal transmitters. The signal transmitters emit electromagnetic or infrared signals that reflect off of objects to the signal receivers, thereby detecting an object proximately located with the electronic device 200. It should be noted that each of the proximity sensors 208 can be any one of various types of proximity sensors, such as but not limited to, capacitive, magnetic, inductive, optical/photoelectric, laser, acoustic/sonic, radar-based, Doppler-based, thermal, and radiation-based proximity sensors. Other types of sensors will be obvious to those of ordinary skill in the art.

In one embodiment, one or more proximity sensors 208 can be infrared proximity sensors that transmit a beam of infrared light that reflects from a nearby object and is received by a corresponding signal receiver. The proximity sensors 208 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 200.

In one embodiment, the one or more processors 216 may generate commands based on information received from one or more proximity sensors 208. The one or more processors 216 may generate commands based upon information received from a combination of the one or more proximity sensors 208 and one or more other sensors 209. Alternatively, the one or more processors 216 can generate commands based upon information received from the one or more other sensors 209 alone. Thus, the one or more processors 216 may process the received information alone or in combination with other data, such as the information stored in the memory 218.

The one or more other sensors 209 may include a microphone 240, a earpiece speaker 241, a second loudspeaker (disposed beneath speaker port 232), and a mechanical input component such as button 214. The one or more other sensors 209 may also include key selection sensors, a touch pad sensor, a touch screen sensor, a capacitive sensor, and one or more switches. Touch sensors may used to indicate whether any of the user actuation targets 204,205,206,207 on present on the display 202 are being actuated. Alternatively, touch sensors in the housing 201 can be used to determine whether the electronic device 200 is being touched at side edges, thus indicating whether certain orientations or movements of the electronic device 200 are being performed by a user. The other sensors 209 can also include surface/housing capacitive sensors, audio sensors, and video sensors (such as a camera).

The other sensors 209 can also include motion detectors 242, such as accelerometers or gyroscopes. For example, an accelerometer may be embedded in the electronic circuitry of the electronic device 200 to show vertical orientation, constant tilt and/or whether the device is stationary. The motion detectors 242 are also operable to detect movement of the electronic device 200 by a user. In one or more embodiments, the other sensors 209 and the motion detectors 242 can each be used as a gesture detection device. Illustrating by example, in one embodiment a user can deliver gesture input by moving a hand or arm in predefined motions in close proximity to the electronic device 200. In another embodiment, the user can deliver gesture input by touching the display 202. In yet another embodiment, a user can deliver gesture input by shaking or otherwise deliberately moving the electronic device 200. Other modes of delivering gesture input will be obvious to those of ordinary skill in the art having the benefit of this disclosure.

Other components operable with the one or more processors 216 can include output components 243 such as video outputs, audio outputs 244, and/or mechanical outputs. Examples of output components include audio outputs 244 such as speaker port 232, earpiece speaker 241, or other alarms and/or buzzers and/or a mechanical output component such as vibrating or motion-based mechanisms.

In one embodiment, the one or more processors 216 are operable to change a gain on the microphone 240 such that voice input from a user can be received from different distances. For example, in one embodiment the one or more processors 216 are operable to operate the microphone 240 in a first mode at a first gain sensitivity so that voice commands from a user can be received from more than one foot away from the device. If the electronic device 200 is a smartphone, for instance, the one or more processors 216 may operate the microphone 240 in a first mode at a first gain sensitivity to receive voice input from a user when operating in a speakerphone mode for example. Similarly, when the electronic device 200 is configured with a voice control interface engine 245, the one or more processors 216 may operate the microphone 240 in a first mode at a first gain sensitivity to receive voice input from a user several feet away. This would cause the microphone 240 to function as did the microphone of prior art electronic device (100) of FIG. 1 in which voice commands (102) could be received from several feet away.

In one embodiment, the one or more processors 216 may further operate the microphone 240 in a second mode at a second gain sensitivity to receive voice input from a user. In one embodiment, the second gain sensitivity is less than the first gain sensitivity. This results in voice input being received from closer distances at lower levels. If the electronic device 200 is a smartphone, for instance, the one or more processors 216 may operate the microphone 240 in a second mode at a second gain sensitivity to receive voice input from a user when the electronic device 200 is placed against the user's face. As the microphone 240 is very close to the user's mouth, this second, lesser gain sensitivity can be used to capture lower volume voice input from the user. Similarly, when the electronic device 200 is configured with a voice control interface engine 245, the one or more processors 216 may operate the microphone 240 in a second mode at a second gain sensitivity to receive voice input from a user's mouth that may be only an inch (or less) from the microphone 240. Not only can this assist in keeping third parties and eaves droppers from hearing a conversation when operating in the discreet mode of operation, but it can be of assistance in noisy environments since the user is delivering voice commands from a close proximity to the microphone 240.

In a similar fashion, the one or more processors 216 can operate one or both of the earpiece speaker 241 and/or the loudspeaker under speaker port 232 in either a first mode or a second mode. In one embodiment, the one or more processors 216 are operable to change a gain of either speaker such that audible output from the electronic device 200 can be heard by a user at different distances. For example, in one embodiment the one or more processors 216 are operable to operate one or both of the earpiece speaker 241 and/or the loudspeaker under speaker port 232 in a first mode at a first gain so that audible output is produced at a first output level. In one embodiment, the first output level is a volume sufficient that the audible output can be heard from more than one foot away from the device. If the electronic device 200 is a smartphone, for instance, the one or more processors 216 may operate one or both of the earpiece speaker 241 and/or the loudspeaker under speaker port 232 in a first mode at a first gain to produce output at a louder volume when operating in a speakerphone mode for example. Similarly, when the electronic device 200 is configured with a voice control interface engine 245, the one or more processors 216 may operate the one or both of the earpiece speaker 241 and/or the loudspeaker under speaker port 232 in a first mode at a first gain to produce audible output at a first output level so that a user can hear the audible output from a user several feet away. This would cause the one or both of the earpiece speaker 241 and/or the loudspeaker under speaker port 232 to function as did the loudspeaker of prior art electronic device (100) of FIG. 1 in which audible output (103) could be heard from several feet away.

In one embodiment, the one or more processors 216 may further operate the one or both of the earpiece speaker 241 and/or the loudspeaker under speaker port 232 in a second mode at a second gain to produce audible output at a second output level. In one embodiment, the second gain is less than the first gain such that the second output level is at a lower volume than the first output level. This results in audible output only being audible from closer distances due to the lower output levels. If the electronic device 200 is a smartphone, for instance, the one or more processors 216 may operate the one or both of the earpiece speaker 241 and/or the loudspeaker under speaker port 232 in a second mode at a second gain to deliver audible output to a user when the electronic device 200 is placed against the user's face. As the earpiece speaker 241 is very close to the user's ear, this second, lesser gain can be used to deliver audible output at a lower level so as not to overdrive the user's eardrums. Similarly, when the electronic device 200 is configured with a voice control interface engine 245, the one or more processors 216 may operate one or both of the earpiece speaker 241 and/or the loudspeaker under speaker port 232 in a second mode at a second gain to deliver audible output to a user's ear when the earpiece speaker 241 is only an inch (or less) from the earpiece speaker 241. In one embodiment, this second mode of operation, i.e., where the second output level is less than the first output level, is known as the "discreet mode" of operation.

In one embodiment, the one or more processors 216 are to switch between the earpiece speaker 241 and the loudspeaker under speaker port 232 when operating in the first mode and the second mode. For example, the earpiece speaker 241 may comprise a small driver to deliver audible output only a few millimeters. By contrast, the loudspeaker under speaker port 232 may be a large driver to deliver audible output across larger distances. Where this is the case, when operating in the first mode the one or more processors 216 may deliver all audio output from speaker port 232. When operating in the second mode, the one or more processors 216 may deliver all audible output from the earpiece speaker 241. Accordingly, in one or more embodiments the voice control interface engine 245 is operative in the second mode to output the audible output from a second loudspeaker, e.g., earpiece speaker 241, that is different from the loudspeaker operable in the first mode, e.g., speaker port 232.

In one embodiment, the output components 243 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio. For example, these devices may be used to filter noise received from the microphone 240. The output components 243 may be a single component as shown in FIG. 2 or may be implemented partly in hardware and partly in software or firmware executed by one or more processors 216. In some embodiments, the output components 243 may be implemented using several hardware components and may also utilize one or more software or firmware components in various combinations. The output components 243 may be operative to control one or both of the earpiece speaker 241 and/or the loudspeaker under speaker port 232, and/or to selectively turn these output devices ON or OFF. Additionally, the output components 243 can adjust filtering or gain of one or both of the earpiece speaker 241 and/or the loudspeaker under speaker port 232 for purposes of various applications described below.

In one or more embodiments, the electronic device 200 includes a voice control interface engine 245. The voice control interface engine 245 can include hardware, executable code, and speech monitor executable code in one embodiment. The voice control interface engine 245 can include, stored in memory 218, basic speech models, trained speech models, or other modules that are used by the voice control interface engine 245 to receive and identify voice commands. In one embodiment, the voice control interface engine 245 can include a voice recognition engine. Regardless of the specific implementation utilized in the various embodiments, the voice control interface engine 245 can access various speech models to identify speech commands.

In one embodiment, the voice control interface engine 245 is configured to implement a voice control feature that allows a user to speak a specific trigger phrase, followed by a command, to cause the one or more processors 216 to execute an operation. For example, the user may say, as a trigger phase, "Okay, Phone, Ready, now Go!" After this, the user may speak a command, such as "how tall is the Sears Tower?" This combination of trigger phrase and command can cause the one or more processors 216 to access an application module 247, such as a web browser, to search for the answer and then deliver the answer as audible output via an output component 243. For example, when operating in the first mode, the one or more processors 216 may deliver the answer as audible output through speaker port 232 at a first output level. When operating in the discreet mode, the one or more processors 216 may deliver the answer as audible output through the earpiece speaker 241 at a second, softer output level. In short, in one embodiment the voice control interface engine 245 listens for voice commands, processes the commands and, in conjunction with the one or more processors 216, returns an audible output that is the result of the user's intent.

In one or more embodiments, the one or more processors 216 are operable to transition the voice control interface engine 245 between the first mode and the second mode, or discreet mode, in response to detecting a predefined user input. In one embodiment, the predefined user input is a gesture input determined by the proximity sensors 208. In another embodiment, the predefined user input is movement of the electronic device 200 as detected by the motion detectors 242 or other sensors 209. In another embodiment, the predefined user input is placing the display 202 of the electronic device 200 against the user's face as determined by the proximity sensors 208. In yet another embodiment, the predefined user input is actuation of a user actuation target 204,205,206,207 by a finger or stylus. Many of these examples will be explained in more detail with reference to FIGS. 3-5 below. Still others will be obvious to those of ordinary skill in the art having the benefit of this disclosure.

In one or more embodiments, the voice control interface engine 245 is operative in a first mode to receive a speech command through the microphone 240 from a first distance and, in response to the speech command, produce an audible output at a first output level. In one embodiment, this audible output is delivered to a user through speaker port 232.

The one or more processors 216 are then operable to detect a predefined user input. In one embodiment, the predefined user input comprises a predefined motion of the electronic device 200 by using the motion detectors 242 to determine the spatial orientation of the electronic device 200 in three-dimensional space by detecting a gravitational direction. Similarly, the motion detectors 242 or other sensors 209 can include one or more gyroscopes to detect rotational motion of the electronic device. The gyroscope can be used to determine the spatial rotation of the electronic device in three-dimensional space. Each of these can be used to detect gesture input.

In one or more embodiments the one or more processors 216 are configured to detect not only gesture input, but also a predetermined characteristic of a gesture input. Examples of such characteristics include gesture duration, gesture intensity, gesture proximity, gesture accuracy, gesture contact force, or combinations thereof. Where the one or more processors 216 detect such a predetermined characteristic, it can be used to control the voice control interface engine 245, and to toggle it between a first mode of operation and a second mode of operation.

When detection of the predefined user input occurs, in one embodiment the one or more processors 216 are operable to transition the voice control interface engine 245 to a second mode of operation, which is the discreet mode in one embodiment. When operating in the discreet mode, the voice control interface engine 245 is operable to receive speech commands from a second distance that is less than the first distance associated with the first mode. Further, the voice control interface engine 245 can be operable to produce, in response to the received speech commands, an audible output at a second output level that is less than the first output level. In one embodiment, these softer output commands are delivered to a user through the earpiece speaker 241.

Figure 3:
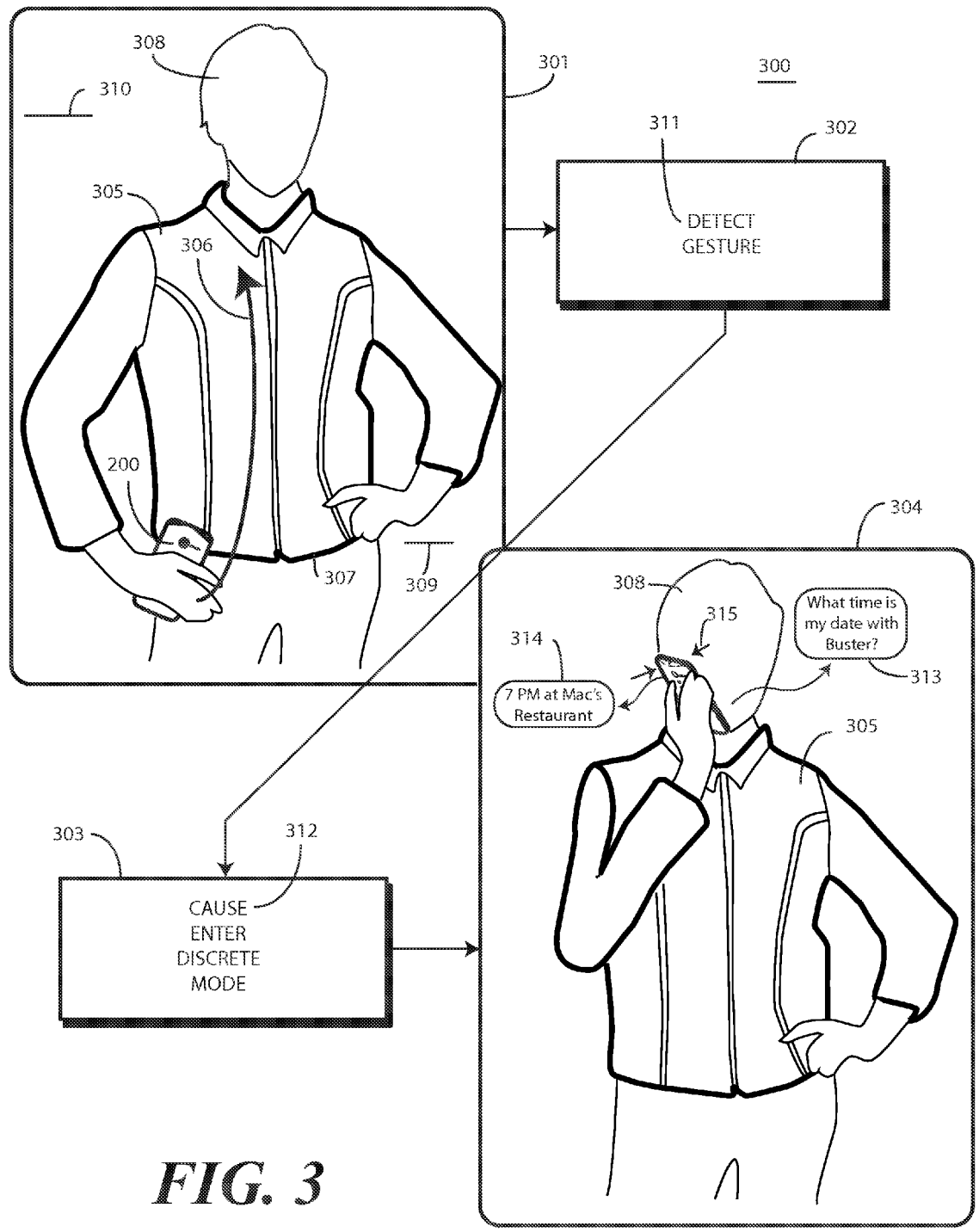
FIG. 3 illustrates one explanatory method in accordance with one or more embodiments of the disclosure.

Advantageously, by delivering the predefined user input to cause the voice control interface engine 245 to transition from the first mode to the discreet mode, the user can take advantage of voice controlled operation without third parties or eavesdroppers hearing the information delivered in the form of audible output. This solves the unforeseen problem illustrated in FIG. 1 where onlookers could overhear the audible response. Thus, if a user plans to listen to a voice mail that may be of a sensitive nature, the user simply delivers the predefined user input to the electronic device 200 to cause the one or more processors 216 to transition the voice control interface engine 245 to the discreet mode of operation, as is illustrated in FIG. 3 below. As noted, the predefined user input can be any of a gesture input, a touch input, a predefined movement of the electronic device 200, or other predefined gesture.

It is to be understood that the electronic device 200 and the architecture of FIG. 2 is provided for illustrative purposes only and for illustrating components of one electronic device 200 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Turning now to FIG. 3, illustrated therein is a method 300 of using an electronic device 200 in accordance with one or more embodiments of the disclosure. At step 301, a user 305 is shown holding the electronic device 200. At step 301, the electronic device 200 is operating in a default mode of operation, which is the first mode of operation where the voice control interface engine (245) is operative to receive a speech command from a first distance and produce, in response to the speech command, an audible output at a first output level. Thus, the electronic device 200 would function exactly as the prior art electronic device (100) of FIG. 1 when operating in the first mode. The user 305 could deliver, in a normal conversational tone, a voice command asking, "How tall is the Sears Tower?" and the electronic device 200 would announce the answer with an audible output that the user 305 could hear several feet away.

However, in FIG. 3, the user 305 is interested in receiving personal information that she does not want third parties to hear. Accordingly, at step 301 the user delivers a predefined user input 306 by raising the electronic device 200 from her waist 307 to her head 308. Accordingly, the predefined user input 306 of this explanatory step 301 comprises lifting the electronic device 200 from a first elevation 309 to a second elevation 310, where the second elevation 310 is greater than the first elevation 309.

At step 302, the one or more processors (216) of the electronic device detect 311 the predefined user input 306. At step 303, the one or more processors (216) cause 312 the voice control interface engine (245) to transition to a second mode. As shown at step 304, in the second mode the voice control interface engine (245) is operative to receive the speech command 313 from a second distance and produce, in response to the speech command, the audible output 314 at a second output level. Here, the user 305 is asking, "What time is my date with Buster?" The audible output 314, which no eavesdroppers can hear due to its lower volume, says, "Seven PM at Mac's Restaurant."

In one embodiment, the second distance is less than the first distance of the first mode. Further, the second output level is less than the first output level. This is illustrated in the drawings by comparing FIG. 1 and FIG. 3. In FIG. 1, the user 101 is a first distance 104 from the prior art electronic device 100. In FIG. 3, the user 305 is a second distance 315 from the electronic device 200 that is less than the first distance (104). The second output level is indicated by the smaller text of the audible output 314 of FIG. 3 compared with the large text of the audible output (103) of FIG. 1.

In another embodiment, the predefined user input 306 is not movement of the electronic device 200 from one elevation 309 to another elevation 310. Instead, in another embodiment the predefined user input 306 is detected by the proximity sensors (208) that are operable with the one or more processors (216). For example, in another embodiment at step 304, the proximity sensors (208) can detect that the electronic device is proximately located with the user's head 308. When this occurs, the one or more processors (216) can cause the voice control interface engine (245) to transition to a second mode operative to receive speech commands 313 from a second distance 315 and produce, in response to the speech command 313, the audible output at a second output level as previously described.

Figure 4:
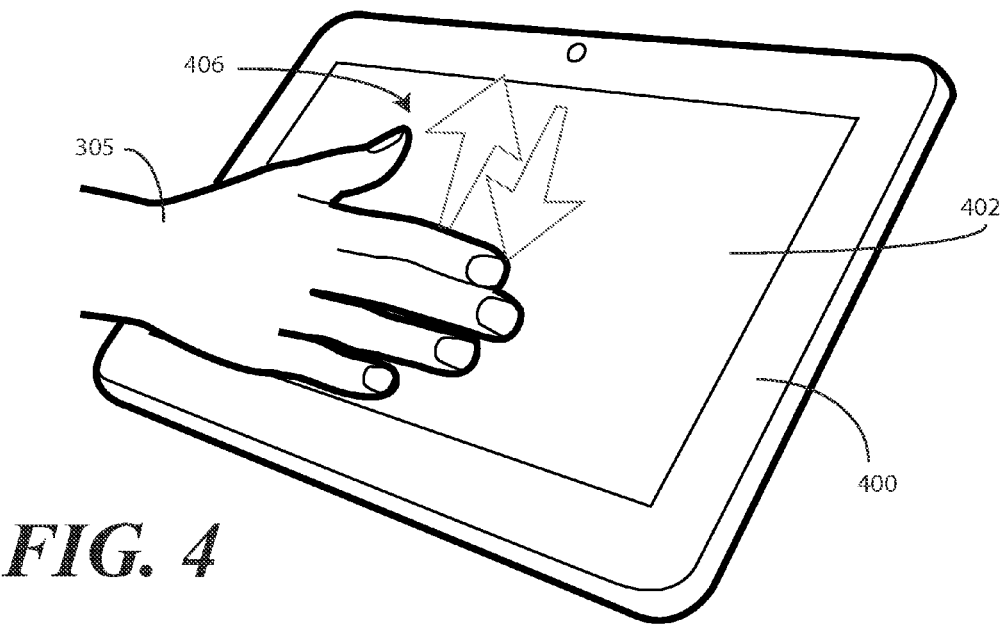
FIG. 4 illustrates an alternate method step suitable for use with explanatory methods in accordance with one or more embodiments of the disclosure.

Turning now to FIG. 4, illustrated therein is another predefined user input 406. In this embodiment, the predefined user input 406 comprises an open-air gesture that can be used to cause the voice control interface engine (245) to transition to a second mode operative to receive speech commands from a second distance and produce, in response to the speech command, the audible output at a second output level as previously described.

In some embodiments, the proximity sensors (208) and/or other sensors (209) can be configured to detect such predefined gesture input. For example, in one embodiment the proximity sensors (208) can comprise an infrared detector. Open-air gesture input may be detected from reflections of infrared signals from a user while the user is making gestures in close proximity to the proximity sensors (208). In another embodiment, the proximity sensors (208) comprise an imaging device such as a camera. In such an embodiment, open-air gesture input may be detected by capturing successive images of a user making a gesture in close proximity to the imaging device. In yet another embodiment, open-air gesture input is detected by light. The proximity sensors (208) can include a light sensor configured to detect changes in optical intensity, color, light, or shadow in the near vicinity of the electronic device 200. The light sensor can compare successive readings of luminous intensity, color, or other spatial variations between images to detect motion or the presence of an object near the electronic device 200. In still another embodiment, the proximity sensors (208) can include one or more devices to emit an electromagnetic or electrostatic field. A receiver then receives reflections of the field from the nearby object. The proximity sensors (208) detect changes in the received field to detect positional changes of nearby objects based upon changes to the electromagnetic or electrostatic field resulting from the object becoming proximately located with a sensor.

In FIG. 4, the user 305 is waving a hand a few inches above the display 402 of an electronic device 400 to create the open-air gesture. A user interface includes a gesture detector and is capable of detecting open-air gestures within about five inches of the electronic device 400. Accordingly, by waving the hand back and forth, the user 305 is able to cause the voice control interface engine (245) to transition to a second mode operative to receive speech commands from a second distance and produce, in response to the speech command 313, the audible output at a second output level.

It should be noted that the open-air gesture can occur in two dimensions about the electronic device 400 in one embodiment. In another embodiment, the movements of the open-air gesture can occur in three dimensions about the electronic device 400. Where the predefined gesture comprises a three-dimensional input occurring about the electronic device 400, a wider number of gestures become available as the predefined user input. Illustrating by way of a simple example, a three-dimensional input could include the waving, i.e., the movements of the open-air gesture, followed by an upward rise to provide motion in a third dimension. Other predefined motions will be obvious to those of ordinary skill in the art having the benefit of this disclosure.

Figure 5:
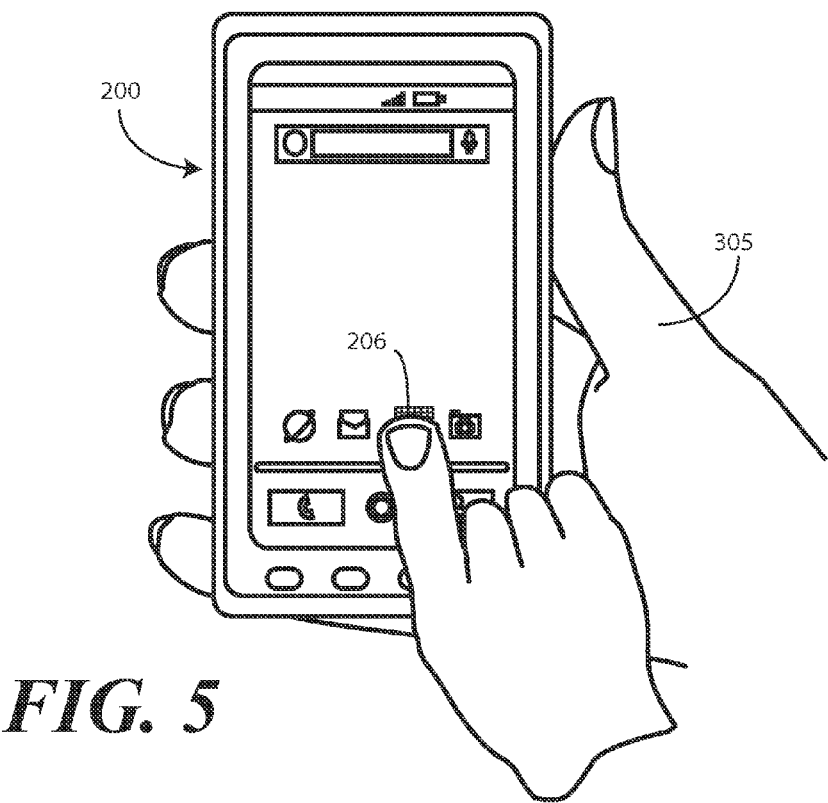
FIG. 5 illustrates an alternate method step suitable for use with explanatory methods in accordance with one or more embodiments of the disclosure.

Turning to FIG. 5, in this embodiment the user 305 is delivering the predefined user input by touching a user actuation target 206. This provides a more direct method of delivering a predefined user input to the electronic device 200 cause to the voice control interface engine (245) to transition to a second mode operative to receive the speech command from a second distance and produce, in response to the speech command, the audible output at a second output level.

Other examples of predefined user input will be obvious to those of ordinary skill in the art having the benefit of this disclosure. For example, in the prior art example of FIG. 1, had the prior art electronic device 100 been an electronic device (200) configured in accordance with embodiments of the disclosure, another example of a predefined user input would be moving the electronic device (200) from a first position distally located from the user 101, such as on the table 105, to a second position proximately located with a user 101, such as near the user's head 106 or face 107. In any of the above examples, the one or more processors (216), operable with the proximity sensors (208) and/or other sensors (209), are operable to identify the predefined gesture input and to cause the voice control interface engine (245) to transition to a second mode operative to receive the speech command from a second distance and produce, in response to the speech command, the audible output at a second output level.

Figure 6:
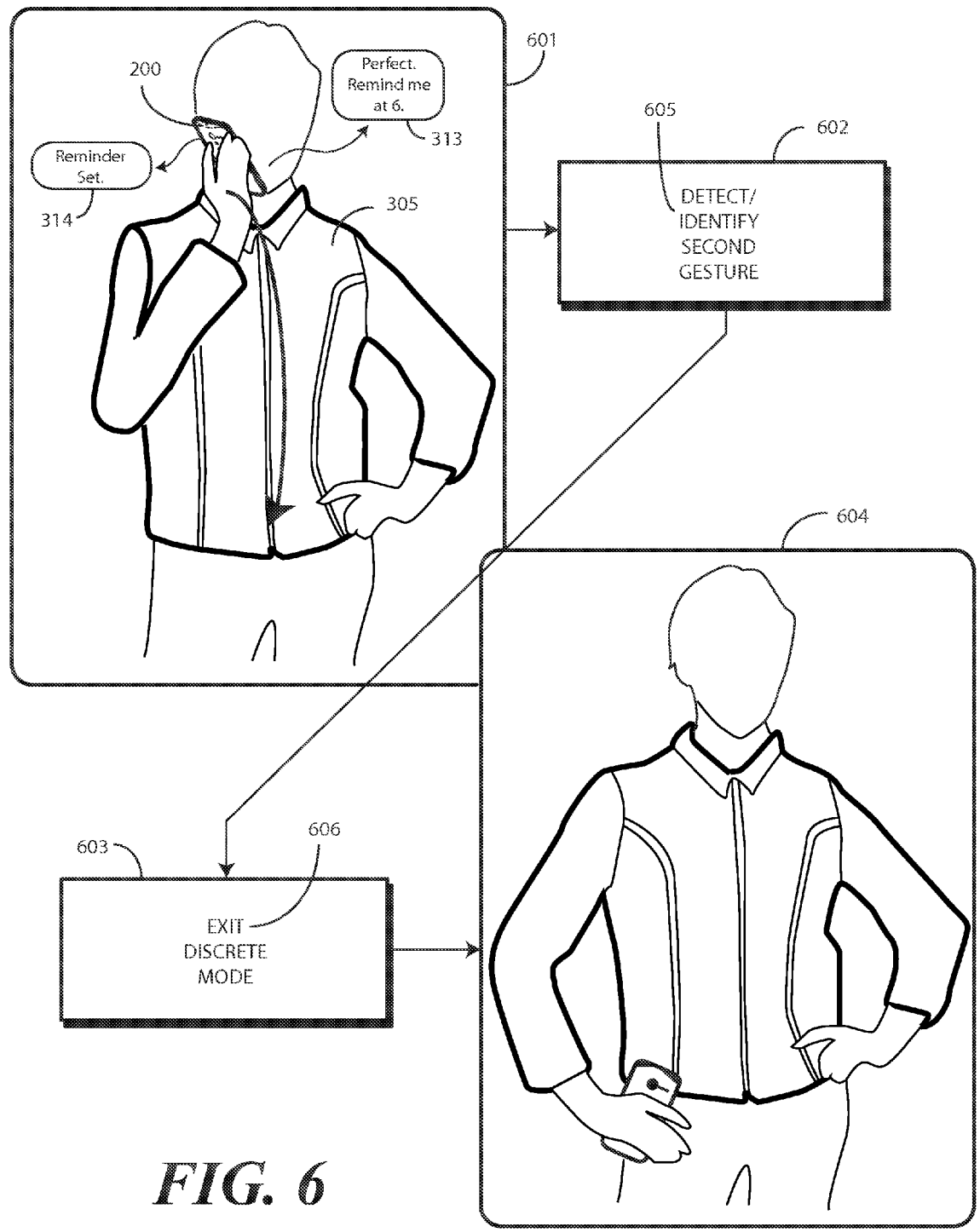
FIG. 6 illustrates another explanatory method in accordance with one or more embodiments of the disclosure.

Embodiments of the disclosure contemplate that once the voice control interface engine (245) is in the second mode, it can be desirable to transition the electronic device (200) back into the first mode of operation so that it can be used as shown in FIG. 1. There are a variety of ways to accomplish this. Turning now to FIG. 6, illustrated therein is one such embodiment.

At step 601, the electronic device 200 is operating in the second mode, where speech commands 313 are received at a softer volume and audible responses are delivered at the second, softer output level. In this example, the user 305 is continuing the conversation from step (304) of FIG. 3, as the voice command is to remind the user of the date with Buster at 6 PM. The audible output 314 generated says, "Reminder set."

The user 305 is now done with the discreet mode of operation. Accordingly, in one embodiment, the user 305 can return the voice control interface engine (245) to the first mode of operation when a predefined condition is identified. In FIG. 6, the predefined condition is a reverse motion 605 of the electronic device 200, which is identified 605 by one or both of the proximity sensors (208) and/or other sensors (209) at step 602. When this occurs, in one embodiment at step 603 the one or more processors (216) are operable to return 606 the voice control interface engine (245) to the first mode of operation.

As with the predefined user input to cause the voice control interface engine (245) to enter the second mode, the predefined condition can be any of a number of conditions. For example, in another embodiment, the predefined condition can be a gesture input such as that shown in FIG. 4.

In yet another embodiment, the predefined condition can be actuation of a user actuation target as shown in FIG. 5. For example, if the user 305 touches a button (214) or user actuation target (206) to place the electronic device 200 in a low power or sleep mode, the one or more processors (216) may return the voice control interface engine (245) to the first mode of operation, which is a default mode in one or more embodiments.

In still another embodiment, the electronic device 200 includes a timer (246). Once user interaction is complete, e.g., when the user 305 is done delivering the speech command 313 at step 601, the one or more processors (216) can start the timer (246). When the timer (246) expires, the one or more processors (216) can return the voice control interface engine (245) to the first mode of operation by identifying the expiration of the timer (246) as the predefined condition. Other predefined conditions will be obvious to those of ordinary skill in the art having the benefit of this disclosure.

Figure 7:
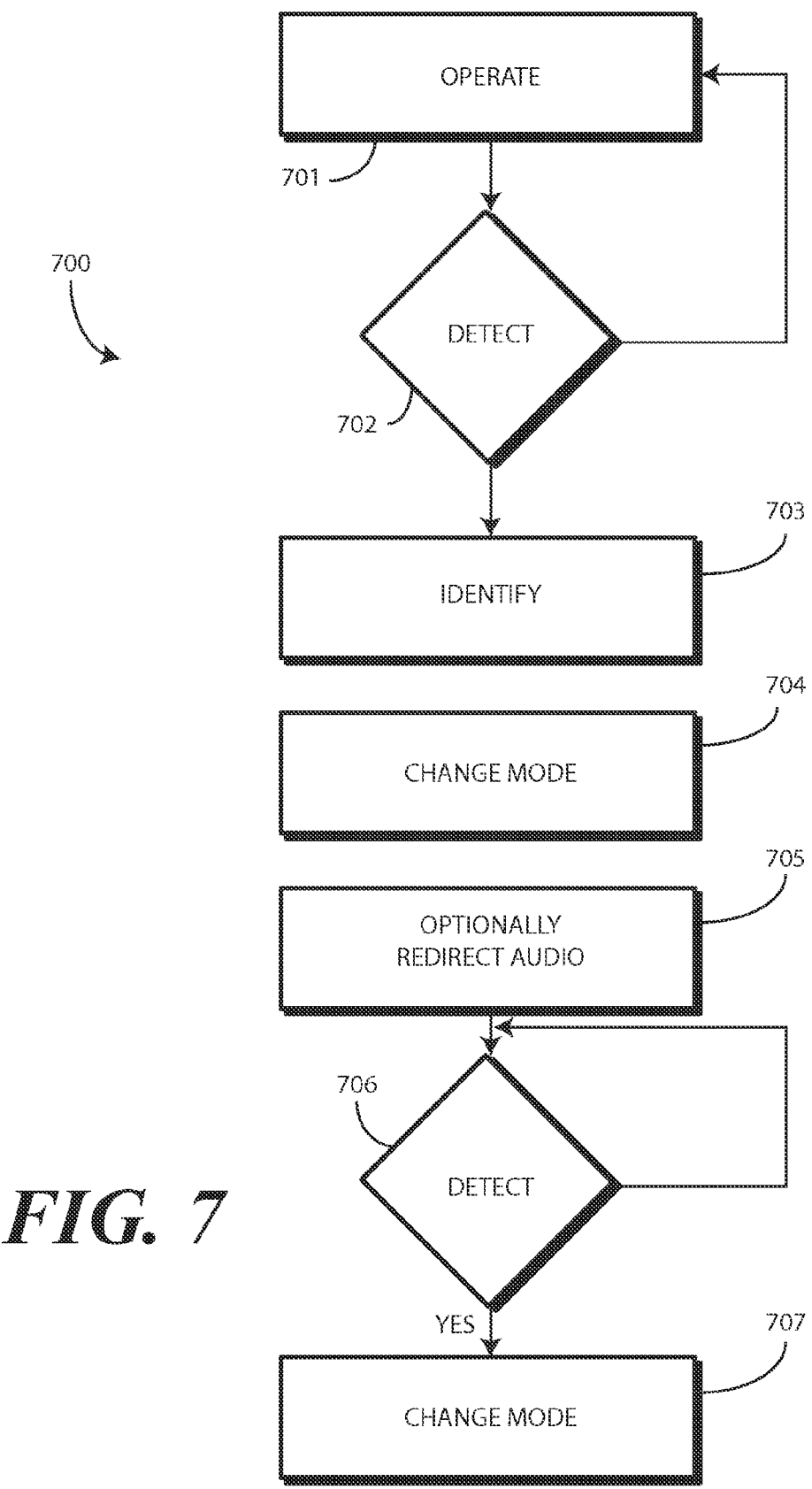
FIG. 7 illustrates another explanatory method in accordance with one or more embodiments of the disclosure.

Turning now to FIG. 7, illustrated therein is one method 700 in accordance with one or more embodiments of the disclosure. At step 701, the method 700 includes operating a voice control interface engine of an electronic device in a first mode. In one embodiment, when operating in the first mode at step 701 the electronic device is operative to receive a speech command from a first distance and produce, in response to the speech command, an audible output at a first output level.

At decision 702, the method 700 detects a predefined user input. In one embodiment, one or more processors of the electronic device perform decision 702. In one embodiment, the predefined user input of decision 702 comprises a predefined gesture input. For example, the predefined gesture input can include lifting the electronic device from a first elevation to a second elevation. In one embodiment, the second elevation is greater than the first elevation. In another embodiment, the predefined gesture input comprises moving the electronic device from a first position distally located from a user to a second position proximately located with a user. In one embodiment, the second location is proximately located with a user's head as detected by one or more proximity sensors.

In one embodiment, the predefined user input of decision 702 comprises executing a predefined motion about the electronic device. In another embodiment, the predefined user input of decision 702 comprises actuation of a user actuation target of the electronic device. Other predefined user input examples will be obvious to those of ordinary skill in the art having the benefit of this disclosure.

At step 703, the method 700 identifies the predefined user input received at decision 702. At step 704, the method 700 causes the voice control interface engine to transition to a second mode operative to receive the speech command from a second distance and produce, in response to the speech command, the audible output at a second output level. In one embodiment, the second distance of step 704 is less than the first distance of step 701. In one embodiment, the second output level of step 704 is less than the first output level of step 701. At optional step 705, the method 700 comprises redirecting the audible output to an earpiece loudspeaker of the electronic device.

At decision 706, the method 700 detects a predefined condition. In one embodiment, the predefined condition comprises a gesture input. In another embodiment, the predefined condition comprises expiration of a timer. In yet another embodiment, the predefined condition comprises actuation of a user actuation target or control button of the electronic device. In yet another embodiment, the predefined condition comprises placement of the electronic device into a low power or sleep mode. In another embodiment, the predefined condition comprises the expiration of a timer after user interaction with the electronic device is complete. Once user interaction is complete, e.g., when the user is done delivering the speech command, a timer can be initiated. When the timer expires, the method 700 can return the voice control interface engine to the first mode of operation by identifying the expiration of the timer as the predefined condition. Other predefined conditions will be obvious to those of ordinary skill in the art having the benefit of this disclosure. Where the predefined condition occurs, in one embodiment at step 707 the method 700 returns the voice control interface engine to the first mode in response to identifying a predefined condition.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising:
   operating a voice control interface engine of an electronic device in a first mode operative to receive a speech command from a first distance and produce, in response to the speech command, an audible output at a first output level;
   detecting, with one or more motion detectors operable with one or more processors of the electronic device to determine a spatial orientation of the electronic device in three-dimensional space, a predefined user input comprising a lifting of the electronic device from a first elevation to a second elevation; and
   causing, with the one or more processors, the voice control interface engine to transition to a second mode operative to receive the speech command from a second distance and produce, in response to the speech command, the audible output at a second output level;
   the second distance less than the first distance and the second output level less than the first output level.

2. The method of claim 1, the detecting comprising identifying, with one or more sensors operable with the one or more processors, a predefined gesture input.

3. The method of claim 1, the second elevation greater than the first elevation.

4. The method of claim 2, the predefined gesture input comprising moving the electronic device from a first position distally located from a user to a second position proximately located with the user.

5. The method of claim 4, the second position proximately located with the user's head.

6. The method of claim 2, the predefined gesture input comprising a predefined motion about the electronic device.

7. The method of claim 1, the detecting comprising identifying, with a user interface, actuation of a user actuation target.

8. The method of claim 1, further comprising redirecting the audible output to an earpiece loudspeaker of the electronic device.

9. The method of claim 1, further comprising returning, with the one or more processors, the voice control interface engine to the first mode in response to identifying a predefined condition.

10. The method of claim 9, the predefined condition comprising a predefined gesture input.

11. The method of claim 9, the predefined condition comprising expiration of a timer.

12. An apparatus comprising:
    a motion detector operable to detect whether the apparatus is stationary;
    a voice control interface engine operative in a first mode to receive a speech command, through a microphone, from a first distance and produce, through a loudspeaker and in response to the speech command, an audible output at a first output level;
    one or more processors operable with one or more sensors, the one or more processors to:
      detect, with the motion detector, a predefined user input moving the electronic device in three-dimensional space; and
      transition the voice control interface engine to a second mode operative to receive the speech command from a second distance and produce, in response to the speech command, the audible output at a second output level;
    the second distance less than the first distance and the second output level less than the first output level.

13. The apparatus of claim 12, the predefined user input comprising a gesture input.

14. The apparatus of claim 12, the predefined user input comprising a touch input.

15. The apparatus of claim 12, the predefined user input comprising a predefined movement of the apparatus.

16. The apparatus of claim 12, the voice control interface engine operative in the second mode to output the audible output from a second loudspeaker different from the loudspeaker.

17. The apparatus of claim 12, the one or more processors further operable to, with the one or more sensors, detect a predefined condition and cause the voice control interface engine to return to the first mode.

18. The apparatus of claim 17, further comprising a timer operable with the one or more processors, the predefined condition comprising expiration of the timer.

19. The apparatus of claim 17, the predefined condition comprising a predefined movement of the apparatus.

20. The apparatus of claim 17, the apparatus comprising an electronic device, the predefined condition comprising placement of the electronic device into a low power or sleep mode.

* * * * *